E. P. LACEY.
Corn-Planter.
No. 14,631. Patented Apr. 8, 1856.
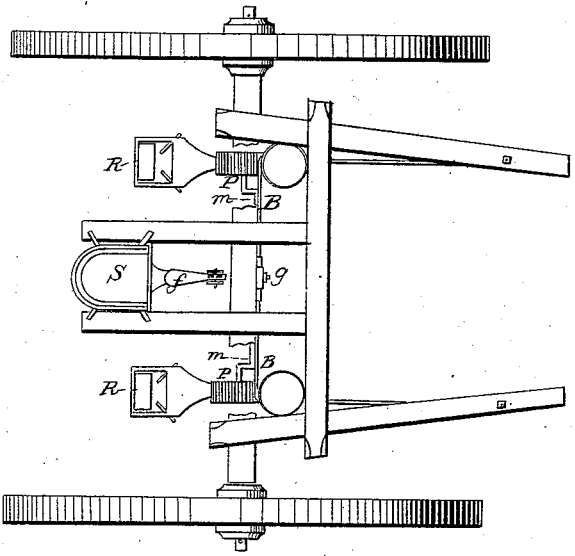
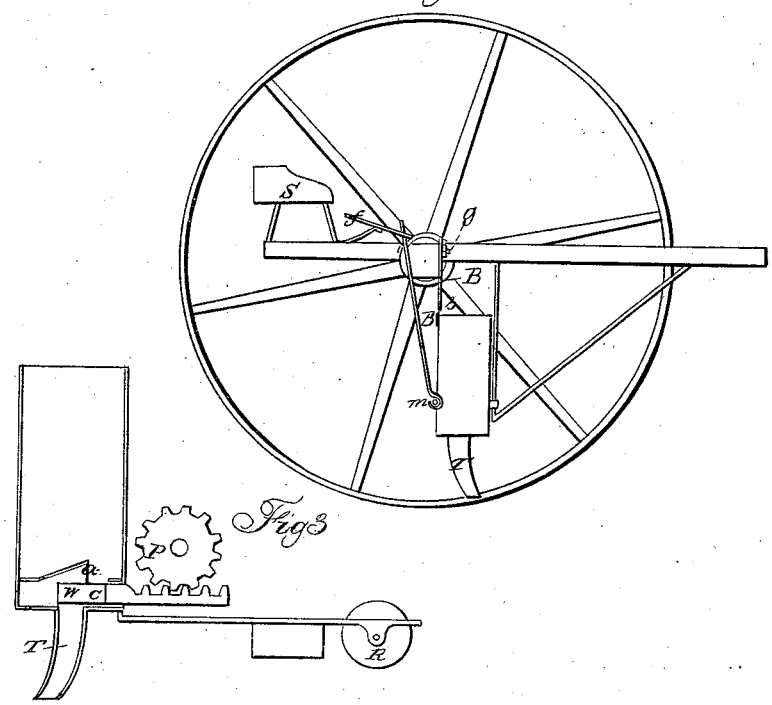

UNITED STATES PATENT OFFICE.

E. P. LACEY, OF ROCHESTER, NEW YORK.

IMPROVEMENT IN CORN-PLANTERS.

Specification forming part of Letters Patent No. 14,631, dated April 8, 1856.

*To all whom it may concern:*

Be it known that I, EDWARD P. LACEY, of the city of Rochester, county of Monroe, and State of New York, have invented certain new and useful Improvements in Machines for Planting Corn and other kinds of Seed, of which the following is a full and accurate description, reference being had to the accompanying drawings, making part of this specification, in which—

Figure 1 is a plan of the machine with part of the top frame removed. Fig. 2 is a section on line X Y, Fig. 1, said section being partly in elevation. Fig. 3 shows the seed-box and slide in detail.

The nature of this invention consists in so constructing and arranging the machine that the driver can by a slight pressure of his foot drop the requisite quantity of seed at such distances apart as he may desire. To obtain this I construct the machine as shown in the drawings.

In Fig. 2 will be seen the arrangement of the seat $s$ and treadle or foot-lever $f$, operating the rod $r$ and bar $m$. As the bar $m$ is cranked, as shown in Fig. 1, and turns on the same centers as the pinions P P, it will be evident that any action on the rod $r$ will rotate these pinions, which in their turn will operate the slide N, Fig. 3, when sufficient corn to plant a hill will descend through the tube T.

The construction and arrangement of the seed-box and slide will be at once understood from the drawings, Fig. 3. It will be seen that the chamber $c$ in the slide will carry forward a sufficient amount of corn, the surplus being swept off by the spring-apron $a$. When the chamber is moved far enough to coincide with the opening of the tube T the corn will drop into the furrow.

In order to accommodate the seed-plow or tubes T T to variations in the level of the surface of the soil, I connect and support them by the bar B, which moves on a central pivot, $b$, while the seed-boxes slide up and down the brace-rods, and are thus kept quite steady and rigid.

R R are rollers to cover in the seed after it has been dropped.

Hitherto the great difficulty with corn-planting machines has been that variations in the surface of the soil cause a variation in the rotation of the wheels, and, as these are usually geared to regulate the periodicity of the descent of the corn, a variation in the latter must often occur; and, as when this once takes place it must go on increasing until all regularity or coincidence between the parallel rows is destroyed, it is consequently impossible to plant corn in checks by said machines. In my machine, however, the driver, by the action of the foot-lever, can drop the corn in both rows at just such positions as may be required, and as a few inches difference in the position of the hills is of no moment so long as the parallel rows coincide nearly, he can locate the hills with sufficient accuracy to subserve every purpose, while any error committed in one hill need not necessarily be carried to the rest, but may at any time be corrected.

To indicate the distance of the hills apart, the ground is divided, as usual, in a direction at right angles to the rows.

The distance of the wheels from the seed-plows, being exactly half the distance of the rows apart, serve as a guide by simply driving one of them in the rut made in planting the previous row.

The depth to which the corn is planted may be regulated by means of the slide D, screwed by the nut and screw $g$, the point of attachment of the foot-lever to the rod $r$ being varied to correspond thereto.

What I claim as my invention, and desire to secure by Letters Patent, is—

The combination of the seat $s$ with the treadle or foot-lever $f$, rod $r$, bar $m$, and rack and pinions P P, the whole operating in the manner and for the purpose set forth.

ED. P. LACEY.

Witnesses:
JOHN PHIN,
ALBERT S. JOHNSTON.